April 19, 1927.  M. F. ANDERSON ET AL  1,625,584
BRAKE
Filed Feb. 5, 1926

M.F.Anderson,
T.F.Clark,  Inventors

By Clarence A. O'Brien
Attorney

Patented Apr. 19, 1927.

1,625,584

UNITED STATES PATENT OFFICE.

MERVYN FRANCIS ANDERSON AND THEODORE FAUROT CLARK, OF HOBOKEN, NEW JERSEY.

BRAKE.

Application filed February 5, 1926. Serial No. 86,272.

Our present invention pertains to brakes and contemplates the provision of a brake adapted to be used to advantage in various relations, and one that is highly efficient in action notwithstanding the simplicity and compactness of its construction.

Other objects and practical advantages of the invention will be fully understood from the following description and claims, when the same are read in connection with the drawings, accompanying and forming part of this specification, in which:—

Similar numerals of reference designate corresponding parts in all of the views of the drawings.

Figure 1:
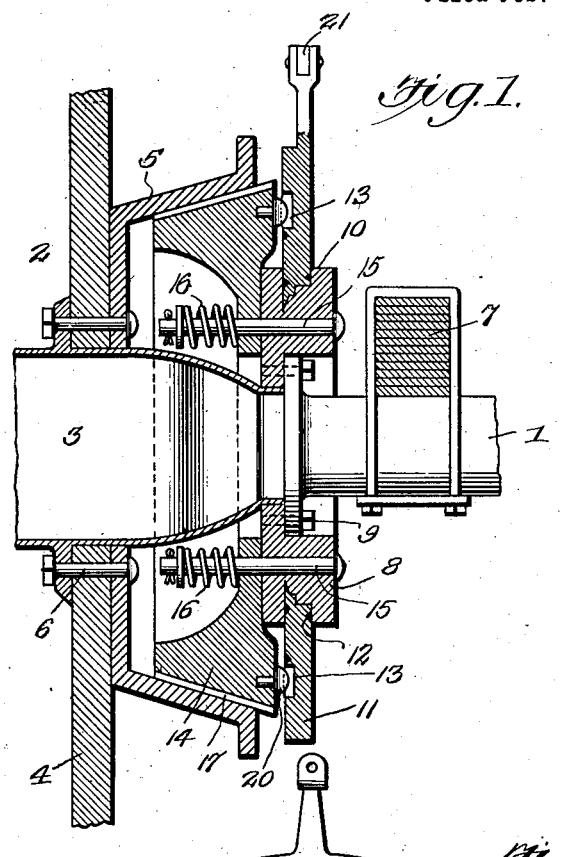
Figure 1 is a vertical section illustrating the preferred embodiment of our invention as applied for use in the control of an automobile wheel.
Figure 2:
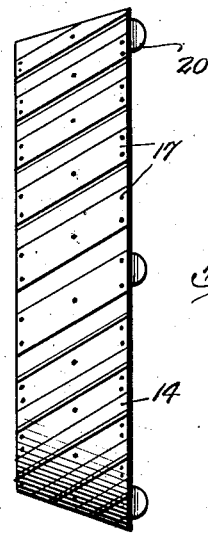
Figure 2 is an edge elevation of the male member of the brake.
Figure 3:
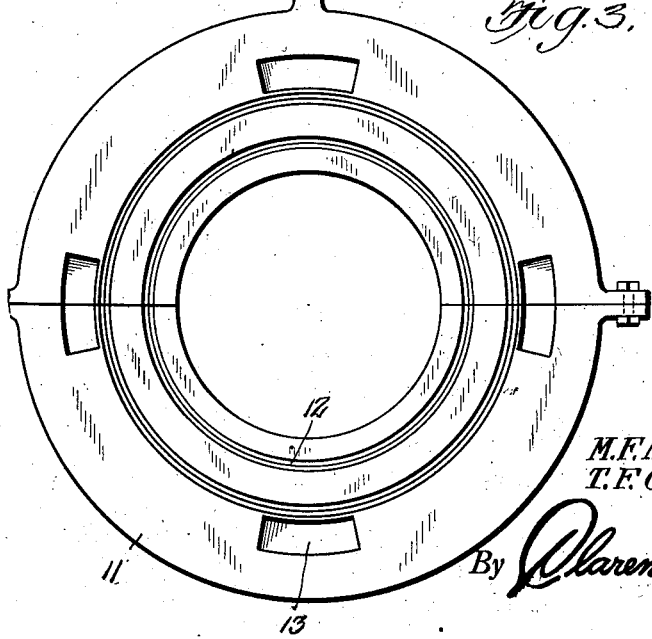
Figure 3 is a detail side elevation of the annular thrust member of the organized mechanism.
Figure 4:
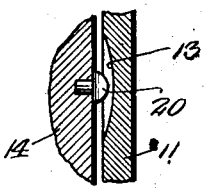
Figure 4 is a fragmentary section taken at an angle to Figure 1 and showing in detail the means for bringing about a cam thrust action on turning of the annular thrust member about its axis.

We show in Figure 1 and axle housing 1 and a wheel 2 such as employed in automobile construction, the hub of the wheel 2 being designated by 3 and the spokes by 4. In accordance with the illustrated embodiment of our invention a female member or tapered drum 5 is fixed with respect to the wheel 2 through the medium of bolts 6 or other appropriate means. The axle housing 1 is illustrated as connected with a spring 7, and is equipped at 8 with what may be properly denominated an annular anchor member, the said member 8 being connected at 9 with a flanged portion of the housing 1, and being provided with a circumferential groove 10, preferably, though not necessarily, shaped in cross-section as shown in Figure 1. Surrounding and adapted to be turned about the anchor member 8 and disposed in the circumferential groove 10 thereof is the annular thrust member 11 of the improvement, the inner edge of the thrust member 11 being shaped in conformity with the bottom of the circumferential groove 10, and being provided, by preference, at 12 with oil grooves. In its side confronting the female member 5, the turnable thrust member 11 is provided with cam grooves 13, Figures 1, 3 and 4. The male member of our improvement is designated by 14 and is tapered as shown for frictional engagement with the female member 5. The said male member 14 is connected by bolts 15 with the anchor member 8, and is held by the said bolts against turning, and it will also be noted that springs 16 are employed on the bolts 15 which springs 16 tend to press the male member 14 toward the right in Figure 1 with a view to disengaging the same from the female member 5. On the perimeter of the male member 14 are strips 17 of appropriate brake lining material. The said strips 17 are riveted or fastened through th medium of machine screws to the taper surface of the member 14, and said strips 17 are arranged diagonally, Figure 2, and are spaced anart, and consequently the male member 14 is enabled to automatically clear itself of grease and grit. It will also be manifest that the brake lining afforded by the strips 17 will wear evenly about the member 14, and in that way will prolong the efficiency of the brake for an indefinite period. At the side of the male member 14 contiguous to the thrust member 11 are pins 20 with rounded heads arranged opposite the grooved portion or portions of the thrust member 11. By virtue of this it will be manifest that when the thrust member 11 is turned in either direction about its axis the male member 14 will be powerfully thrust toward the left in Figure 1 and in engagement with the drum or female member 5 so as to powerfully brake the member 5 and the rotor or rotary element to which the said member 5 is fixed. When, however, the thrust member 11 is turned in reverse direction so as to bring the comparatively deep portions of the cam grooves 13 opposite the rounded heads of the pins 20, the male member 14 will by springs 16 be moved toward the right in Figure 1 and out of engagement with the female member 5.

Obviously the several parts of our improvement may be made of any material or materials best suited to the purposes of the parts, and we have therefore deemed it unnecessary to stipulate the material of which the different parts are made.

It will be apparent from the foregoing that our novel brake is prompt and efficient in action, and that it is compact in construction as is always desirable. It will also be noticed that immediately following movement of the thrust member 11 in proper direction, the springs 16 will release the brake by forcing the male member 14 toward the right in Figure 1, and this without any drag whatever.

It will be apparent from the foregoing that the male member 14 of our improvement is anchored in a peculiar and advantageous manner to the axle housing 1; and it will also be apparent that but little effort is required for the turning of the thrust member, 11 and the application of the brake and the release thereof.

Manifestly when desired adjustment may be attained by shortening the brake rod 21 in connection with the trust member 11 and by putting washers under the heads of the pins 20.

We have entered into a detailed description of the construction and relative arrangement of the parts embraced in the present and preferred embodiment of our invention in order to impart a full, clear and exact understanding of the said embodiment. We do not desire, however, to be understood as confining ourselves to the specific construction and relative arrangement of the parts as disclosed, our invention being defined by our appended claims within the scope of which changes in arrangement and in construction may be made without departure from our invention.

Having described our invention, what we claim and desire to secure by Letters-Patent, is:—

1. In a brake and in combination, a tapered female member for connection to a rotary element, an anchor member having a circumferential groove the bottom of which is stepped, a tapered male member held against turning and movable laterally with respect to the anchor member and having rounded protuberances at its side remote from the female member, spring means for moving the male member in a direction away from the female member, and an annular turnable thrust member arranged in the circumferential groove of the anchor member and having its inner edge stepped and also having in its face confronting the male member grooves for cooperation with said protuberances; the said tapered male member having on its perimeter diagonal spaced strips of brake lining.

2. In a brake and in combination, an axle housing, a wheel, a tapered female brake member fixed with respect to the wheel, an annular anchor member surrounding and fixed to said housing and having a circumferential groove, a laterally movable tapered male member arranged between the female member and the anchor member, rods extending through and connecting the anchor member and male member and adapted to hold the latter against turning, springs on said rods for moving the male member in a direction away from the female member, protuberances on the side of the male member remote from the female member, and an annular, turnable thrust member surrounding the anchor member and disposed in the circumferential groove thereof and having in opposed relation to the said protuberance cam grooves.

3. In combination, a tapered male brake member, a tapered female brake member, and spaced diagonal strips of friction creating material on one of the same and opposed to the tapered surface of the other.

In testimony whereof we affix our signatures.

THEODORE FAUROT CLARK.
MERVYN FRANCIS ANDERSON.